United States Patent [19]

Boger et al.

[11] Patent Number: 4,874,451

[45] Date of Patent: Oct. 17, 1989

[54] METHOD OF FORMING A DISPOSABLE DIAPER WITH CONTINUOUS/INTERMITTENT ROWS OF ADHESIVE

[75] Inventors: Bentley J. Boger, Atlanta; Peter J. Petrecca, Dunwoody, both of Ga.

[73] Assignee: Nordson Corporation, Westlake, Ohio

[21] Appl. No.: 216,766

[22] Filed: Jul. 8, 1988

Related U.S. Application Data

[60] Continuation-in-part of Ser. No. 55,656, May 29, 1987, abandoned, which is a division of Ser. No. 841,587, Mar. 20, 1986, Pat. No. 4,687,137.

[51] Int. Cl.[4] ........................ B32B 31/08; B32B 31/12

[52] U.S. Cl. .................................... 156/291; 156/324; 156/344; 156/269; 428/198; 428/286; 604/365

[58] Field of Search ............... 156/291, 324, 344, 269; 428/195, 198, 284, 286; 604/365, 366

[56] References Cited

U.S. PATENT DOCUMENTS

| | | |
|---|---|---|
| 2,726,632 | 12/1955 | Asbeck et al. . |
| 3,052,565 | 9/1962 | Chinn et al. . |
| 3,184,811 | 5/1965 | Bennett et al. . |
| 3,420,208 | 1/1969 | Guthrie . |
| 3,596,432 | 8/1971 | Straub et al. . |
| 3,905,329 | 9/1975 | Cone et al. . |
| 4,068,614 | 1/1978 | Kopachkov . |
| 4,073,408 | 2/1978 | Hartwig . |
| 4,096,973 | 6/1978 | Checko . |
| 4,119,058 | 10/1978 | Schmermund . |
| 4,157,149 | 6/1979 | Moen . |
| 4,200,207 | 4/1980 | Akers et al. . |
| 4,256,526 | 3/1981 | McDaniel . |
| 4,274,586 | 6/1981 | Hill . |
| 4,285,655 | 8/1981 | Matsubara . |
| 4,420,510 | 12/1983 | Kunkel et al. . |
| 4,557,217 | 12/1985 | Zingg . |

FOREIGN PATENT DOCUMENTS

| | | | |
|---|---|---|---|
| 0111850 | 6/1984 | European Pat. Off. . | |
| 0158087 | 10/1985 | European Pat. Off. . | |
| 0382030 | 10/1932 | United Kingdom ............. | 68/205 R |
| 2013512 | 8/1979 | United Kingdom . | |

OTHER PUBLICATIONS

Chung, C. I. et al, "Designing Coat-Hanger Dies by Power-Law Approximation", *Modern Plastics*, Mar. 1976, pp. 52-56.

*Polymer Engineering & Science*, Y. Matsubara, "Residence Time Distribution of Polymer Melts in the Linearly Tapered Coat-Hanger Die", Jan. 1983, vol. 23, No. 1, pp. 17-19.

*Primary Examiner*—Robert A. Dawson

*Attorney, Agent, or Firm*—Wood, Herron & Evans

[57] ABSTRACT

A method and adhesive dispensing apparatus for applying continuous, parallel rows of adhesive onto the center portion of the backing sheet of a disposable diaper and intermittent, parallel rows of adhesive on the outer portions of the backing sheet on either side of the center portion. The apparatus includes a slot nozzle, divided into two center sections and two end sections, which is formed with flow passageways for each section having a coat hanger profile including a plurality of spaced, discharge orifices to form the parallel adhesive rows. A valving arrangement including solenoid-operated center dispensing valves for each center section of the nozzle, and solenoid-operated dispensing and recirculation valve pairs for each end section of the nozzle, controls the flow of adhesive to the nozzle. The center dispensing valves are continuously opened during an operating run to apply continuous adhesive beads on the center portion of the backing sheet, and the outer dispensing valves are opened and closed intermittently to form gaps on the end portions of the backing sheet without adhesive where the leg holes of the diaper are subsequently cut to form individual diapers.

6 Claims, 5 Drawing Sheets

METHOD OF FORMING A DISPOSABLE DIAPER WITH CONTINUOUS/INTERMITTENT ROWS OF ADHESIVE

RELATED CASES

This application is a continuation-in-part of U.S. patent application Ser. No. 07/055,646, entitled "Continuous/Intermittent Adhesive Dispensing Apparatus", filed May 29, 1987, now abandoned, which is a divisional of U.S. Ser. No. 841,587, filed Mar. 20, 1986, U.S. Pat. No. 4,687,137, issued Aug. 18, 1987.

FIELD OF THE INVENTION

This invention relates to a method and apparatus of forming disposable diapers, and, more particularly, to the method of applying multiple, parallel uniform rows of adhesive continuously onto one portion of the backing sheet of a disposable diaper and intermittently onto another portion of a backing sheet.

BACKGROUND OF THE INVENTION

One product which acquires the application of multiple, parallel, uniform rows of adhesive is disposable diapers. In the manufacture of disposable diapers, parallel rows of pressure-sensitive adhesive are applied to a moisture impervious backing sheet of the diaper so as to adhere the backing sheet to the absorbent, non-woven pad of the diaper. To ensure secure attachment of these layers by means of an economical quantity of adhesive, while obtaining an acceptable visual appearance of the resulting product, parallel adhesive rows in the form of beads or a spray pattern must be accurately positioned along the backing sheet and formed in uniform width and thickness.

It has been the practice in prior art methods of making disposable diapers to employ a metering gear head positioned above a moving layer of the plastic backing sheet to apply multiple, parallel beads of pressure-sensitive adhesive to the plastic backing sheet for subsequent attachment to an absorbent pad. Metering gear heads include a plurality of spaced discharge orifices which are each supplied with adhesive from a separate gear pump for applying multiple, parallel beads of adhesive on the plastic backing sheet. Although metering gear heads apply adhesive beads on a substrate with good accuracy, and dispense beads of uniform size and width, there are several problems in the use of metering gear heads for the manufacture of disposable diapers.

One problem with metering gear heads is that they are relatively heavy and bulky, making it difficult to mount them in close proximity on a diaper manufacturing line. The size of metering gear heads is attributable, in part, to the fact that each bead they dispense on a surface requires a separate gear pump and an associated drive motor to control the flow of adhesive forming the bead. The use of separate gear pumps for dispensing each bead contributes to high cost of the metering equipment, and results in a relatively complex metering device. As a result, the cost for maintaining the equipment is very appreciable.

Another problem with metering gear heads is that their operation results in a substantial waste of adhesive in the manufacture of disposable diapers. Cut-outs are made at intervals in the backing sheet and non-woven layer of the diaper material for the leg holes, and a substantial savings of adhesive could be realized if the adhesive was applied intermittently to the outer edges of the diaper to leave a gap without adhesive where the leg holes are cut.

If metering gear heads are operated intermittently to dispense adhesive, they produce a substantial cut-off drool when turned off, and then do not immediately provide consistent flow when turned back on. A disposable diaper manufactured by an intermittently operated metering gear head would therefore have uneven and/or varying width adhesive beads on both sides of the backing sheet where the leg hole is cut, which is visually unacceptable. As a result, metering gear heads are operated continuously in the manufacture of disposable diapers and apply continuous multiple beads across the entire width of the backing sheet of the diaper.

SUMMARY OF THE INVENTION

It is therefore among the objectives of this invention to provide a method and apparatus for dispensing adhesive onto a substrate such as the moisture impervious backing sheet of a disposable diaper which avoids waste of adhesive at the outer edges of the diaper where the leg holes are cut, which provides accurately placed, uniformly sized adhesive rows with a relatively simple system, which is compact, which is economical to manufacture and which requires little maintenance.

These objectives are accomplished, and one aspect of this invention is predicated upon providing, a slot nozzle carried by the applicator head of an adhesive dispensing apparatus which dispenses multiple accurately positioned rows of molten thermoplastic adhesive such as pressure-sensitive hot melt adhesive upon a substrate. The nozzle comprises a pair of die halves which are mirror images of one another and connect together for mounting upon the applicator head. The mating die halves are formed with a number of adhesive flow passageways divided into separate sections. In a presently preferred embodiment, the die halves are divided into four sets or sections of separate adhesive flow passageways including two adjacent center sections and two outer or end sections on opposite sides of the center sections.

The adhesive flow passageways in the die halves of the nozzle which define the nozzle sections are each formed with a "coat hanger" profile having the general shape of an isosceles triangle. Each nozzle section includes a pair of fluid runners connected to an adhesive inlet line at one end, and extending in opposite direction from the inlet line at an obtuse included angle relative to one another. Preferably, the runners each have a decreasing cross sectional area from the inlet line to their outer ends. A triangular-shaped slot, having a small width compared to the diameter of the runners, is formed in each die half between the runners and an elongated discharge bar at the base of the nozzle opposite the runners. The apex of the triangular slot is located at the point where the runners connect to the inlet line, and the base of the triangular slot is parallel with the discharge bar. The discharge bar is formed with a plurality of spaced orifices each of which communicate with the triangular slot.

The purpose of the slot nozzle herein is to obtain the same volumetric flow of adhesive through all of the spaced discharge orifices within each nozzle section. In order for the flow rate through each discharge orifice to be identical, the pressure of adhesive supplied to each discharge orifice must be the same regardless of whether they are closest or furthest away from the adhesive inlet line where the adhesive is supplied.

The same pressure drop across each discharge orifice is obtained by the coat hanger profile of the slot nozzle including the configuration of the runners and the thin, triangular slot extending from the runners to the discharge bar. Adhesive from the inlet line flows into each runner, and from the runners into the triangular slot. Some of the adhesive enters the triangular slot immediately, and the rest flows along the runners and enters the triangular slot between its apex and the ends of the runners. The adhesive undergoes fluid shearing within the thin, triangular slot which creates a resistance to flow. The adhesive introduced into the triangular slot at its apex undergoes greater fluid shearing than the adhesive entering the triangular slot nearer the ends of the runner because the adhesive travels a greater distance through the elongated slot to the discharge bar from its apex than from its outer ends. Therefore, the resistance to flow of the adhesive is more at the middle of the triangular slot and progressively decreases toward its ends.

By controlling the fluid shearing within the triangular slot, and thus the flow resistance, a pressure gradient is developed within the triangular slot. Due to the decreasing flow resistance of the adhesive in the triangular slot from its middle portion beneath the adhesive inlet to the outer ends, an isobar or line of equal pressure develops along the entry edge of the discharge bar of the nozzle. The pressure drop across the discharge orifices, or the difference between the internal pressure in the triangular slot at the discharge bar and atmospheric pressure at the outer ends of the discharge orifices, is therefore equal for all discharge orifices regardless of their position relative to the adhesive inlet line.

The change in flow resistance provided by the triangular slot also produces another advantage besides pressure equalization at the discharge orifices. When the adhesive flow to any nozzle section is cut off, the pressure at the fluid inlet line immediately drops and the resistance to adhesive flow within the triangular slot prevents the adhesive from readily exiting the discharge orifices of the discharge bar. Because of this change of pressure and resistance to flow, the cut-off drool from the slot nozzle of this invention is severely limited, and no surge of adhesive occurs when the adhesive flow is turned back on.

In one preferred embodiment of this invention, the nozzle is divided into four sections including two center sections, each having six discharge orifices, and two outer or end sections both having four discharge orifices. Each of the center sections and end sections are supplied with adhesive separately from individual supply lines. In some applications, it may be desirable to vary the quantity of adhesive applied to a substrate by one nozzle section or another to obtain adhesive beads of different size on the substrate. This can be achieved without replacing the nozzle of this invention by inserting a restrictor into the inlet line of the nozzle section whose flow is to be varied. In a presently preferred embodiment, the restrictor is a flat disk having a center throughbore whose diameter can vary according to the desired flow to be supplied to the nozzle section. For example, if smaller beads are desired in a particular section of the nozzle, a restrictor having a reduced diameter orifice is inserted in the inlet line for such nozzle section to reduce the flow of adhesive and decrease the size of the adhesive bead applied to the substrate.

In another aspect of this invention, a valving arrangement is provided for controlling the flow of adhesive to the nozzle in which adhesive from an adhesive manifold formed in the applicator head is continuously supplied to the center sections of the nozzle, but intermittently supplied to the end sections of the nozzle. In a presently preferred embodiment, each nozzle section is supplied with adhesive from the adhesive manifold through a separate inlet line connected to an air-piloted dispensing valve.

The inner dispensing valves for the center sections of the nozzle are operated by a single solenoid which controls the flow of operating air to the inner dispensing valves for opening and closing them. In normal operation of the apparatus herein, the solenoid maintains the inner dispensing valves open so that a continuous flow of adhesive is supplied to the center nozzle sections to apply continuous, parallel beads upon the center portion of the substrate.

The air-piloted, outer dispensing valves connected to the adhesive inlet lines for the end sections of the nozzle are each paired with a recirculation valve connected to the adhesive manifold and to an adhesive recirculating line formed in the applicator head. The dispensing valve-recirculation valve pair for each end section of the nozzle is controlled by a separate solenoid. The valve pair for each end section of the nozzle is operated in tandem by the solenoid. Operating air supplied from the air manifold is directed by the solenoid to open the outer dispensing valve and simultaneously close the recirculation valve, or vice versa, to obtain intermittent application of parallel adhesive beads on each end portion of the substrate.

The purpose of the recirculation valves is to maintain a constant flow rate in the adhesive manifold, and, in turn, the inlet lines which feed adhesive to the center sections of the nozzle. With the outer dispensing valves open, adhesive flows from the adhesive manifold, into the outer dispensing valves and through the inlet lines feeding the outer nozzle sections where it is dispensed through the discharge orifices in multiple beads onto the substrate. In order to obtain a gap in the application of adhesive on the end portions of the substrate, the outer dispensing valves must be periodically closed. The recirculation valves recirculate adhesive from the adhesive manifold into the adhesive recirculating line in the applicator head during those periods where the outer dispensing valves are closed by the solenoid. If there was no recirculation of the adhesive supplied to the outer dispensing valves when they are closed, the flow rate of adhesive to the center dispensing valves would increase. This would produce a wider adhesive bead on the substrate when the outer dispensing valves are closed than when they are open. The recirculation valves thus ensure that the flow rate to the center dispensing valves remains constant regardless of whether the outer dispensing valves are opened or closed.

In some instances, it may be desirable to vary the number of adhesive beads applied by the end sections of the nozzle. For example, one or more of the discharge orifices in the end sections of the nozzle might be plugged to reduce the number of beads applied to the end portions of the substrate. Assuming intermittent application of adhesive beads from the end sections of the nozzle is desired, the change in flow rate of adhesive through the end nozzle sections caused by plugging one or more discharge orifices must be matched through the recirculation valve to maintain a constant flow rate to the center sections of the nozzle for the reasons given above.

In another aspect of this invention, a flow rate adjustment mechanism is provided in the line which connects each of the recirculation valves to the adhesive recirculation passageway in the applicator head. The flow rate adjustment provided by this mechanism functions to match the change in flow rate in the adhesive inlet lines feeding the end nozzle sections caused by blocking one or more discharge orifices in such end sections.

A flow rate adjustment mechanism is provided for each recirculation valve which comprises an adjustment pin mounted to the applicator head and movable along an insertion axis which intersects the adhesive recirculating passageway. The adjustment pin has a stem formed with a tapered groove which decreases in cross section from the forward end of the pin rearwardly. The forward end of the stem communicates with the adhesive recirculation passageway, and the rearward portion of the tapered groove in the stem communicates with a flow passageway connected to a recirculation valve. Movement of the pin along the insertion axis changes the position of the tapered groove in the stem relative to the flow passageway from the recirculation valve to increase or decrease the adhesive flow from the recirculation valve into the adhesive recirculation passageway.

The adhesive applicator of this invention is useful in the manufacture of disposable diapers wherein it is desirable to apply parallel rows of adhesive beads intermittently to the outer portions of the backing sheet of the diaper so that adhesive is not wasted where the leg holes are cut away. In accordance with the method of this invention, the solenoid controlling the dispensing valves for the center sections of the nozzle maintains such valves open so that continuous, parallel rows of adhesive are applied to the center portion of the backing sheet of the diaper. The valve pairs which control adhesive flow into each of the end sections of the nozzle are operated by separate solenoids to obtain intermittent application of parallel adhesive rows to the outer edges of the backing sheet on either side of its center section.

In the areas where adhesive is desired, the solenoids open the dispensing valves supplying the end sections of the nozzle and simultaneously close the recirculation valve associated with each dispensing valve. To provide a gap on the substrate without adhesive for the leg holes of the diaper, the solenoid opens the recirculation valve and simultaneously closes the dispensing valve. After the adhesive is applied to the backing sheet in this pattern, a non-woven layer is brought into contact with the backing sheet and adhered thereto. The backing sheet and non-woven layer are then moved beneath a die cutter which cuts the leg holes for the diaper at each location in the outer sections thereof where a gap was formed between the intermittent rows of adhesive.

The adhesive applicator device of this invention disperses precisely positioned beads of adhesive whose size is controlled to a degree at least comparable with prior art metering gear heads. The applicator head, however, is much more compact than prior art metering gear heads, is less expensive and is easier to maintain because the formation of multiple beads is controlled by only six valves. Additionally, intermittent application of adhesive to the outer portions of the substrate is achieved in the nozzle of this invention without cut-off drool when the outer dispensing valves are closed, or a surge of adhesive when the outer dispensing valves are opened. The result is a disposable diaper aesthetically equivalent to that obtained with prior methods, but which provides a substantial savings of adhesive because adhesive is not wasted where the diaper is cut out for the leg holes.

DESCRIPTION OF THE DRAWINGS

The structure, operation and advantages of the presently preferred embodiment of this invention will become further apparent upon consideration of the following description taken in conjunction with the accompanying drawings, wherein.

DETAILED DESCRIPTION OF THE INVENTION

Figure 1:
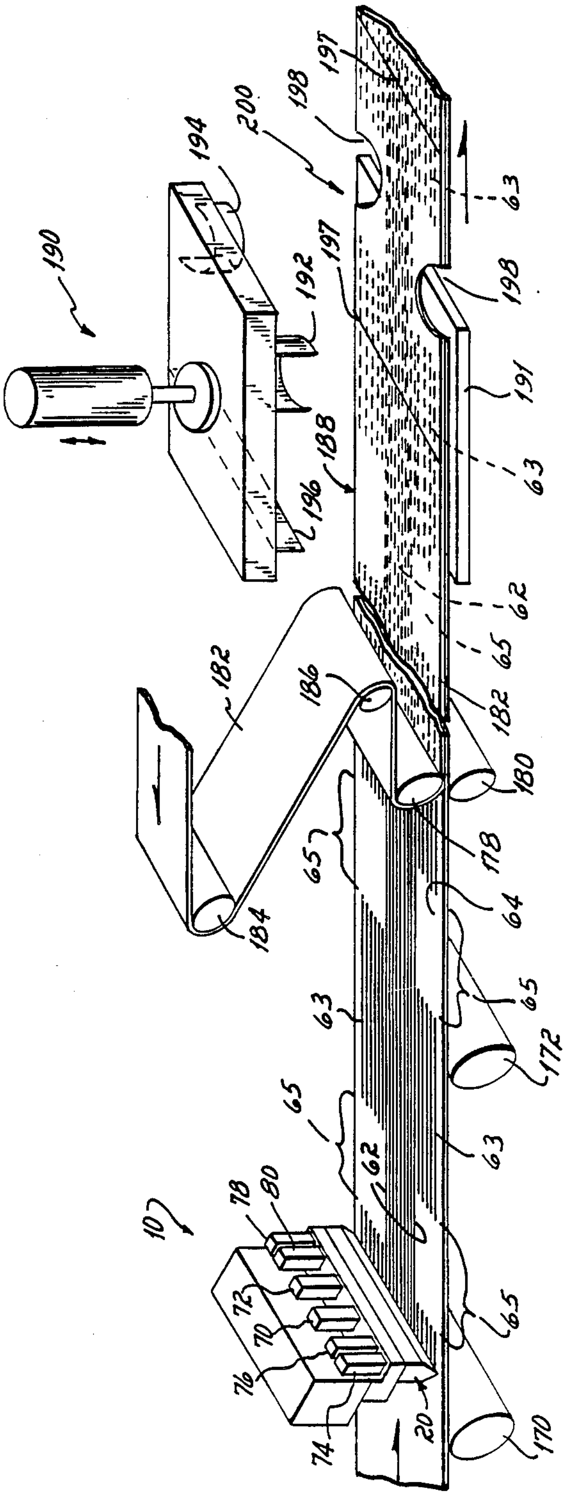
FIG. 1 is an isometric view of the adhesive dispensing apparatus of this invention in a disposable diaper manufacturing line.

Referring now to the drawings, the adhesive dispensing device 10 of this invention includes an applicator head 12 which is formed with an adhesive supply passageway 11 connected by a fitting 13 to a source of pressure-sensitive hot melt adhesive (not shown). The molten adhesive is passed through a cartridge filter 14 which is secured by a cap 15 within a passageway 16 intersecting supply passageway 11. The cap 15 is formed with an internally threaded bore which mounts a threaded stud 17 connected at the forward end of the filter 14. The outer wall of cap 15 is threaded to mate with an annular ring 19 carried by the applicator head 12. After passing through filter 14, the adhesive flows from passageway 16 into an adhesive manifold 18, through a valving arrangement described in detail below, and then into nozzle 20. Preferably, heating lines 21 are mounted in the metal applicator head 12 to maintain the adhesive in a molten state.

Referring now to FIGS. 2 and 6–8, the nozzle 20 of this invention is illustrated in detail. The nozzle 20 includes two die halves 22, 24 connected together by screws 23 for mounting to the base 25 of the applicator head 12. The die halves 22, 24 are mirror images of one another and each are formed with a plurality of adhesive flow passages divided into individual sections including two middle or center sections 26, 28, and two end sections 30, 32 at the outer portion of the die halves 22, 24.

Figure 7:
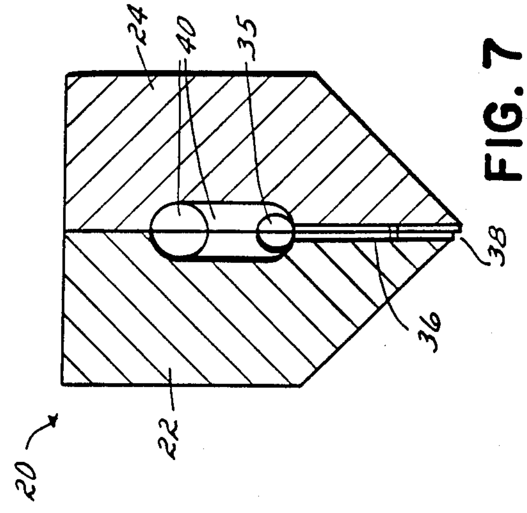
FIG. 7 is a cross section view of the nozzle herein taken generally along line 7—7 of FIG. 6 showing the coat hanger profile of the flow passageways.

As best illustrated in FIG. 7, the adhesive flow passages in each section of the die halves 22, 24 are formed with a coat hanger profile having the general shape of an isosceles triangle. Examples of coat hanger profiles per se are found in U.S. Pat. No. 4,285,655 to Matsubara, issued Aug. 25, 1981, and in the article entitled "Designing Coat-Hanger Dies By Power-Law Approximation", *Modern Plastics,* C. I. Chung et al, March 1976, pp. 52–56, and "Residence Time Distribution of Polymer Melts in the Linearly Tapered Coat-Hanger Die", *Polymer Engineering & Science,* Y. Matsubara, January 1983, Vol. 23, No. 1, pp. 17–19.

The flow passages forming center section 28, for example, include a pair of flow passages or runners 34, 35 of equal length, a thin, triangular-shaped slot 36 connected along the length of each runner 34, 35 and six, spaced discharge orifices 38 formed in a discharge bar 39 connected to the triangular slot 36 opposite the runners 34, 35. Each of the runners 34, 35 is connected at one end to an adhesive inlet line 40 formed in the die halves 22, 24 and extend outwardly at an obtuse, included angle relative to one another from the inlet line 40 to their end sections 42, 44, respectively. The cross section of both runners 34, 35 linearly decreases from the inlet line 40 to their outer ends 42, 44.

The triangular slot 36 is formed with a thin or small width compared to the diameter of the runners 34, 35. The apex 41 of the triangular slot 36 is located at the point where the runners 34, 35 connect to the inlet line 40, and the base 43 of the triangular slot 36 is coincident with the top of the discharge bar 39 formed at the base of center section 28.

The configuration of the flow passageways forming center section 28 is specifically designed to obtain the same pressure drop across each of the discharge orifices 38 in the discharge bar 39 so that the same volumetric flow of adhesive is obtained through all of the discharge orifices 38 to form adhesive beads of uniform size. This is achieved by hydraulic or fluid shearing of the adhesive as it flows through the triangular slot 36 to vary the resistance to flow of the adhesive in the center portion of the triangular slot 36 compared to the end portions. Adhesive from the inlet line 40 flows into each runner 34, 35 and from there into the triangular slot 36. Some of the adhesive from inlet line 40 enters the triangular slot 36 at its apex 41, and the rest of the adhesive flows along the runners 34, 35 entering the triangular slot 36 at some point between the apex 41 and the outer ends 42, 44 of the runners 34, 35.

The adhesive is subjected to fluid shearing within the thin triangular slot 36, which increases resistance to flow. The extent of fluid shearing which the adhesive undergoes is dependent upon its residence time within the triangular slot 36. Adhesive introduced into the triangular slot 36 at its apex 41 undergoes greater fluid shearing than the adhesive entering the triangular slot 36 nearer the ends of runners 34, 35 because it is a greater distance from the apex 41 to the base 43 of the triangular slot 36 than between other portions of the runners 34, 35 and the base 43 of triangular slot 36.

The variation in the resistance to flow of the adhesive within triangular slot 36 produces a pressure gradient therewithin. The pressure of the adhesive is highest near the apex 43 of the triangular slot 36 near inlet line 40 and lowest at the ends 42, 44 of runners 34, 35 which are the furthest from the inlet line 40. In order to match the pressure of the adhesive along the entire length of the discharge bar 39, the pressure of the adhesive in the center of the triangular slot 36 must match that of the adhesive near the outer ends 42, 44 of the runners 34, 35.

Pressure equalization within triangular slot 36 is achieved by the fluid shearing of adhesive to progressively lessen the resistance to flow of the adhesive from the outer ends of triangular slot 36 inwardly toward its center beneath the inlet line 40. By progressively increasing the adhesive flow resistance from the outer ends of the triangular slot 36 toward the apex 43 of the triangular slot 36, an isobar is produced at the discharge bar 39 of the nozzle 20. The pressure drop across the discharge orifices 38, which is the difference between the internal pressure of the adhesive within the triangular slot 36 at the discharge bar 39 and atmospheric pressure at the outer ends of the discharge orifices 38, is therefore equalized for all discharge orifices 38 regardless of their position relative to adhesive inlet line 40.

The adhesive flow resistance provided by the triangular slot 36 also limits cut-off drool when flow of adhesive through inlet line 40 is stopped. When dispensing valve 72 is closed, the pressure at the inlet 40 drops and flow of the adhesive is immediately stopped due to the flow resistance in the triangular slot 36, and therefore cut-off drool from the discharge orifices 38 is limited. Additionally, no surge of adhesive occurs through the discharge nozzles 38 when the adhesive flow is turned back on.

The end sections 30, 32 are identical to one another and are formed in the same configuration and operate identically to the center sections 26, 28. As shown in FIG. 7, end section 32 includes a pair of runners 50, 51 each connected to an adhesive inlet line 52 at one end and extend outwardly at an obtuse, included angle from one another to their outer ends 53, 55, respectively. A thin, triangular slot 58 is connected along the length of the runners 50, 51 and extends downwardly to a discharge bar 59 formed with four spaced discharge orifices 60. The end section 30 has the same structure as end section 32, except for a separate inlet line 54, and the same reference numbers are used to identify the same elements in both end sections 30, 32.

The controlled distribution of adhesive to the orifices 46, 60 results in the formation of parallel, adhesive beads from the center sections 26, 28 and end sections 30, 32, respectively, which are precisely positioned and of controlled, accurate size. In the embodiment shown in the drawings, twenty individual beads of adhesive are applied to a substrate such as the plastic backing sheet 64 of disposable diaper, including six beads 62 from each of the center sections 26, 28 and four beads 63 from each of the end sections 30, 32.

Figure 2:
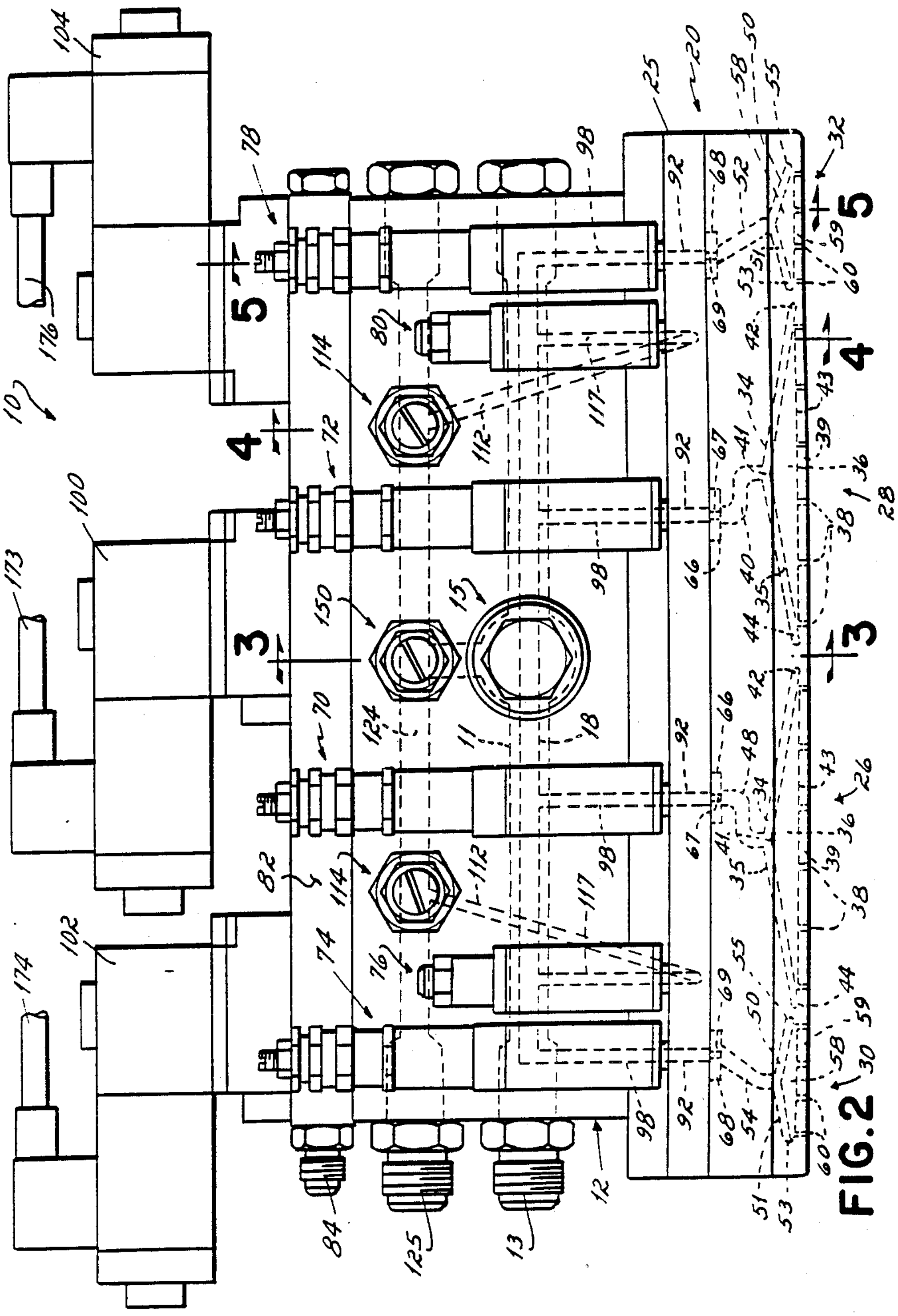
FIG. 2 is a partial front view of the applicator head herein showing the nozzle sections in phantom.
Figure 5:
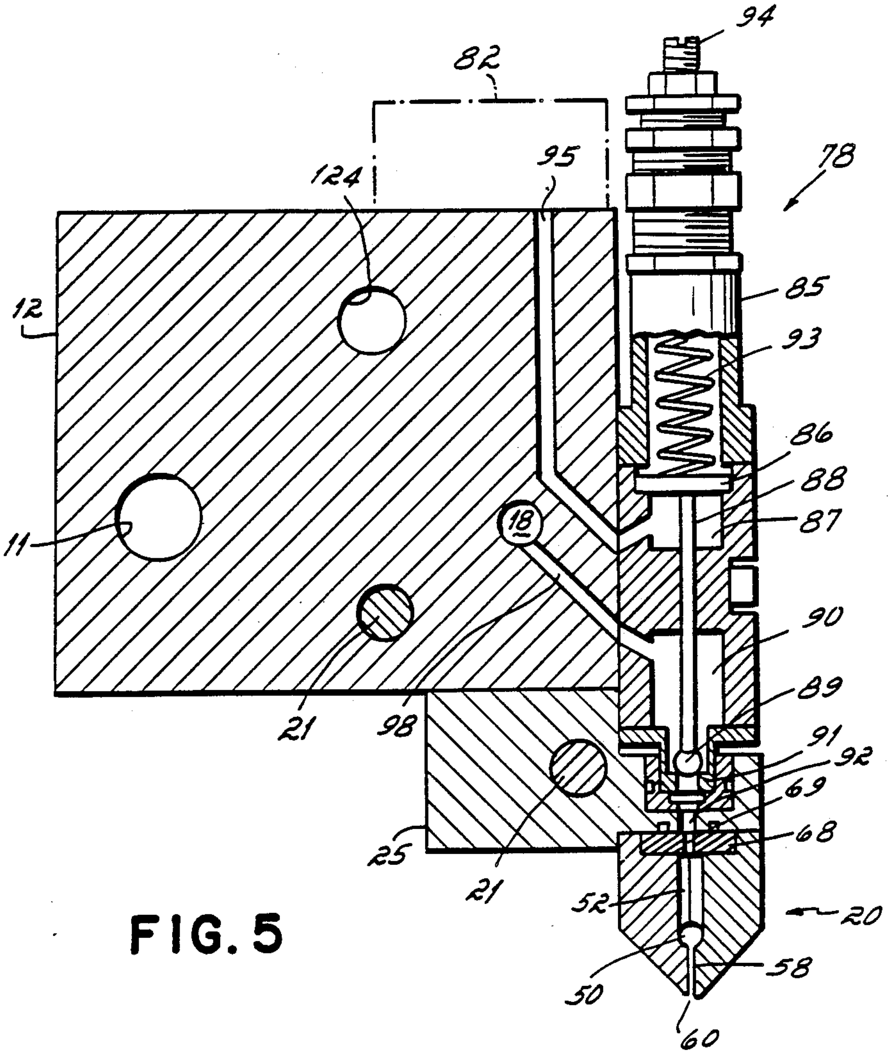
FIG. 5 is a cross sectional view taken generally along line 5—5 of FIG. 2 showing a dispensing valve of this invention.
Figure 6:
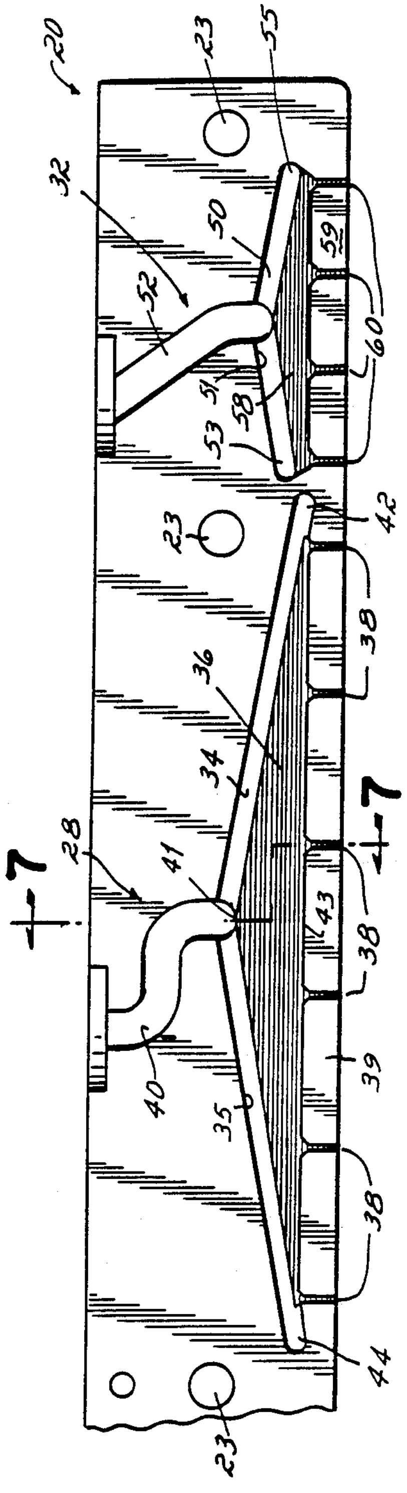
FIG. 6 is an enlarged front view of a portion of the nozzle herein.
Figure 8:
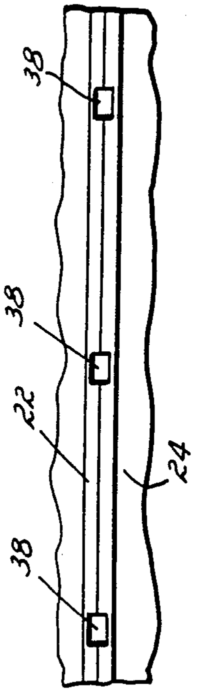
FIG. 8 is a bottom view of FIG. 6 showing the adhesive discharge orifices.

As shown in FIGS. 2 and 5, a restrictor 66 is disposed in each of the adhesive inlet lines 40, 48 feeding center sections 26, 28, and a restrictor 68 is positioned in the inlet lines 52, 54 feeding the end sections 30, 32. The restrictors 66, 68 function to control the volume of adhesive flow to each of the sections in the nozzle 20. Preferably, the restrictors 66, 68 are in the form of a flat disk having a central throughbore 67, 69, respectively, of predetermined diameter.

In some applications, it may be desirable to vary the adhesive flow to one or more of the individual sections of the nozzle 20 so that the size of the adhesive bead 62 or 63 is different from one end of the nozzle 20 to the other. For example, it may be desired to reduce the adhesive flow rate to the end sections 30, 32 of nozzle 20 compared to center sections 26, 28 to obtain a smaller bead 63 on the outer portion of the backing sheet 64. This can be achieved in the nozzle 20 of this invention by replacing the restrictors 68 in inlet lines 52, 54 with another restrictor having a smaller throughbore 69, while maintaining the same restrictors 66 in the inlet lines 40, 48 which feed center sections 26, 28. This enables the volumetric flow to be altered in the end sections 30, 32 of nozzle 20 without replacing the entire nozzle 20.

An important aspect of this invention is the capability of applicator head 20 to control the adhesive flow into each of the sections of the nozzle 20 to provide for both continuous application of multiple adhesive beads, and the intermittent application of multiple beads upon the backing sheet 64. As described in more detail below, in the manufacture of disposable diapers it is desirable to provide gaps 65 with no adhesive in the end portions of the backing sheet 64 where the material is removed to form the leg holes of the diaper. The adhesive dispensing device 10 of this invention is operable to intermittently apply beads 63 of adhesive on the outer portions of the backing sheet 64 to form gaps 65 without adhesive.

The adhesive flow to the nozzle 20 is controlled by a series of valves carried by the applicator head 12. Referring to FIG. 2, there are two center adhesive dispensing valves 70, 72 which control the flow of adhesive to the inlet lines 40, 48, respectively. Flow of adhesive to each of the end sections 30, 32 of nozzle 20 is controlled by a valve pair mounted at each end of applicator head 12. The adhesive supplied to end section 30 is controlled by an outer dispensing valve 74 operatively connected to a recirculation valve 76. Similarly, adhesive flow to end section 32 is controlled by a valve pair consisting of a dispensing valve 78 and a cooperating recirculation valve 80. The operation of each of the dispensing valves and recirculation valves is controlled by operating air supplied by an air manifold 82 formed in applicator head 12 which is connected by a fitting 84 to a high pressure air line (not shown).

Referring now to FIG. 5, the dispensing valve 78 feeding adhesive to the inlet line 52 of end section 32 of nozzle 20 is illustrated. Each of the dispensing valves 70, 72, 74 and 78 are identical and are not described separately herein. The dispensing valve 78 comprises a valve body 85 mounted to the applicator head 12 which carries a reciprocating plunger having a head 86 axially movable within an air chamber 87 formed in the valve body 85. The head 86 of the plunger is connected to a stem 88 formed with a ball 89 at the opposite end which is axially movable within an adhesive chamber 90 formed in the valve body 85. The ball 89 engages a seat 91 formed in a connector line 92 which extends from the adhesive chamber 90 in valve body 85 to the inlet line 52 in nozzle 20. Connector lines 92 are also formed in the applicator head 12 to connect dispensing valves 70, 72 and 74 to the nozzle inlet lines 48, 40 and 54, respectively. A compression spring 93 is mounted in the valve body 85 above the head 86 in air chamber 90 which normally forces the head 86 downwardly so that the ball 89 engages the seat 91 and seals the connector line 92. The force applied by the spring 93 to the head 86 is adjusted by turning a screw 94 connected thereto.

An air passageway 95 is formed in the applicator head 12 from the air manifold 82 to the air chamber 87 in valve body 85. Adhesive is supplied to the outer dispensing valve 78 from adhesive manifold 18 through a passageway 98 formed in applicator head 12 which is connected to the adhesive chamber 90 in valve body 85. Flow of air into the valve body 85 from the air manifold 82 urges head 86 and stem 88 upwardly so that the ball 89 is lifted from the seat 91 opening passageway 92. Adhesive is thus permitted to flow from adhesive chamber 90 into the passageway 92, and then to the inlet line 52 of nozzle end section 32. The outer dispensing valve 78 is closed by stopping the flow of operating air into air chamber 87 which allows compression spring 93 to return the ball 89 of the stem 88 onto the seat 81 to close passageway 92.

In the presently preferred embodiment of this invention, it is desired to obtain continuous multiple, parallel adhesive beads 62 on the center portion of the backing sheet 64 from the center sections 26, 28 of nozzle 20, and spaced or interrupted multiple, parallel adhesive beads 63 on the end portions of backing sheet 64 from the end sections 30, 32 of nozzle 20. Therefore, during operation of the adhesive dispensing device 10 of this invention, the dispensing valves 70, 72 supplying center sections 26, 28 must be maintained open continuously, and the dispensing valves 74, 78 feeding the end sections 30, 32 of nozzle 20 must be opened and closed intermittently.

The supply of operating air from air manifold 82 to the dispensing valves 70, 72 for the center sections 26, 28 of nozzle 20 is controlled by a solenoid 100 operatively connected to the air manifold 82. The solenoid 100 functions to turn on and off the supply of operating air from air manifold 82 to open and close the pilot-operated dispensing valves 70, 72 as described above. In normal operation, the solenoid 100 supplies operating air continuously to the dispensing valves 70, 72 thus maintaining them open at all times during an operating run.

A solenoid valve 102 operatively connected by a four-way valve (not shown) to the air manifold 82 controls the operation of dispensing valve 74 and recirculation valve 76 for end section 30. An identical solenoid valve 104 and four-way valve controls the operation of the valve pair 78, 80 for the end section 32 of nozzle 20. The operation of solenoids 102, 104, and the valve pairs they control, is identical and therefore only the operation of valves 78, 80 is discussed herein.

Figure 4:
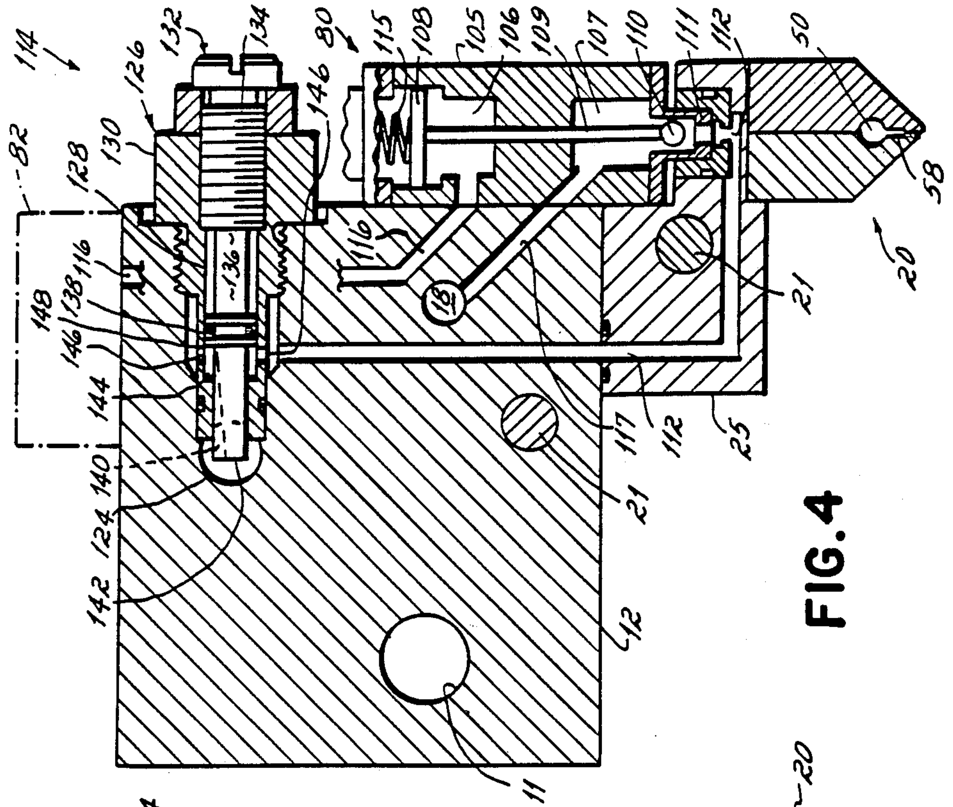
FIG. 4 is a cross sectional view taken generally along line 4—4 of FIG. 2 showing a recirculation valve herein.

Referring to FIGS. 2 and 4, the dispensing valve 78 and recirculation valve 80 for end section 32 are illustrated. The recirculation valve 80 comprises a valve body 105 formed with an air chamber 106 and an adhesive chamber 107. A plunger is axially movable within the valve body 105 and includes a head 108 disposed within the air chamber 106, and a stem 109 disposed within the adhesive chamber 107. The stem 109 includes a ball 110 at one end which is adapted to engage a seat 111 formed at the entrance of an adhesive passageway 112 into the base of valve body 105. The adhesive passageway 112 extends from the valve body 105, through the applicator head 12 and to a flow rate adjustment assembly 114, discussed in detail below. A compression spring 115 is mounted in the valve body 105 above the plunger head 108 which normally urges the head 108 downwardly so that the ball 110 of the stem 109 engages the seat 111 to close the adhesive passageway 112.

Operating air is supplied to recirculation valve 80 from air manifold 82 through an air passageway 116 formed in applicator head 12 which is connected to the air chamber 106 in valve body 105. Adhesive is supplied to the adhesive chamber 107 in valve body 105 through a connector passageway 117 formed in applicator head 12 which extends between the adhesive manifold 18 and the adhesive chamber 107. The adhesive flow through recirculation valve 80 is controlled as follows. Operating air supplied from air manifold 82 is introduced in air chamber 106 below the plunger head 108, forcing it and stem 109 upwardly so that the ball 110 is lifted from the seat 111 and opens adhesive passageway 111. When the air flow is discontinued, the compression spring 115 returns the ball 110 onto the seat 111 to close adhesive passageway 112 and stop the flow of adhesive from chamber 107.

The dispensing valve 78 and recirculation valve 80 are controlled in tandem by solenoid 104. When beads of adhesive 63 are to be placed on the backing sheet 64, the solenoid 104 operates the four-way valve to supply operating air from the air manifold 82 to the dispensing valve 78 and vent the recirculating valve 80 to atmosphere. As discussed above, pressurization of the dispensing valve 78 opens its adhesive passageway 92 to permit adhesive flow into the outer nozzle section 32. Simultaneously, venting of the recirculation valve 80 causes its spring 115 to close adhesive passageway 111 to stop the adhesive flow therethrough. To form a gap 65 of adhesive on the backing sheet 64, the solenoid 104 operates the four-way valve to vent the dispensing valve 78 and pressurize recirculation valve 80 which closes the dispensing valve to adhesive flow and opens the recirculation valve 80 as described above.

The recirculation valves 76, 80 are necessary to ensure the flow rate in adhesive manifold 18 remains constant throughout the intermittent operation of dispensing valves 74, 78. The recirculation valves 76, 80 function to duplicate the adhesive flow through the dispensing valves 74, 78 so that when the dispensing valves 74, 78 are closed, the same flow rate is maintained in adhesive manifold 18, and, therefore, the same amount of adhesive flows through the outer dispensing valves 72, 74 feeding the center sections 26, 28. When the outer dispensing valves 72, 74 are closed, the adhesive is recirculated into an adhesive recirculation passageway 124 formed in the applicator head through the flow rate adjustment assembly 114.

Without the recirculation valves 76, 80, a surge of adhesive flow through the center dispensing valves 70, 72 would occur each time the outer dispensing valves 74, 78 were closed. A surge in adhesive flow would form adhesive beads 62 from the center sections 26, 28 of nozzle 20 which would be larger in size than those formed with the outer dispensing nozzles 74, 78 opened. This result would be unacceptable, particularly in forming of disposable diapers, both from a functional and an aesthetic standpoint. By employing recirculation valves 76, 80, the adhesive flow to the center sections 26, 28 of nozzle 20 through dispensing valves 70, 72 is constant throughout the intermittent operation of the outer dispensing valves 74, 78.

Referring now to FIG. 4, the flow rate adjustment assembly 114 for recirculation valve 80 is illustrated. An identical flow rate adjustment assembly 114 mounted to applicator head 12 and communicating with the adhesive circulation passageway 124 is also provided for recirculation valve 76.

As mentioned above, the purpose of recirculation valves 76, 80 is to match the volumetric flow through their associated outer dispensing valves 74, 78, respectively, so that the flow rate in adhesive manifold 18 remains constant and the center dispensing valves 70, 72 are thus always supplied with the same volumetric flow of adhesive regardless of whether the outer dispensing valves 74, 78 are opened or closed. In some instances, it may be desirable to vary the volumetric flow through one or both of the outer dispensing valves 74, 78. For example, one or more of the discharge orifices 60 of end section 32 may be blocked or plugged to reduce the number of adhesive beads 63 applied to an outer portion of the backing sheet 64. In such application, the volumetric flow of adhesive through the outer dispensing valve 78 would be reduced in proportion to the number of discharge orifices 60 which were closed. In order to match the volumetric flow of adhesive through the dispensing valve 78, the flow permitted through recirculation valve 80 must be adjustable.

The flow rate adjustment assembly 114 provides for variation in adhesive flow through the recirculation valve 80. Referring to FIG. 4, flow rate adjustment assembly 114 comprises an insert 126 threaded into the applicator head 12 in communication with the adhesive circulation passageway 124. The insert 126 is formed of a longitudinally extending throughbore 128 having internal threads along the its outer end 130. The throughbore 128 receives an adjustment pin 132 having a threaded portion 134 which engages the internal threads of the insert 126. The stem 136 of pin 132 extends inwardly within the insert 126 and is sealed to the wall of throughbore 128 by an O-ring 138.

In the presently preferred embodiment, the stem 136 is formed with a tapered groove 140 which progressively decreases in cross section from the forward end 142 of stem 136 rearwardly. The rearward end of tapered groove 140 communicates with an annular slot 144 formed in the insert 126. The annular slot 144 is connected by at least two radially outwardly extending bores 146 formed in insert 126 to an annular slot 148 formed in the applicator head 12. The adhesive passageway 112 formed in applicator head 12 extends from the base of the valve body 105 of recirculation valve 80 to the annular slot 148 at the flow rate adjustment assembly 114.

The flow of adhesive through adhesive passageway 112 into the adhesive circulation passageway 124 is controlled by the axial position of the adjustment pin 132 within the insert 126. The adhesive flows through adhesive passageway 112 into the annular slot 148 formed in applicator head 12, and then through the radial bores 146 into the annular slot 144 of insert 126. In order for the adhesive to reach the adhesive circulation passageway 124 from the annular slot 144, it must flow along the tapered groove 140 formed in the stem 136 of adjustment pin 132. The volume of adhesive flow permitted through groove 140 is determined by its axial position with respect to the annular slot 144 which is controlled by rotating the threaded portion 134 of adjustment pin 132 within the mating threads of throughbore 128.

For example, minimal adhesive flow into adhesive circulation passageway 124 is permitted with only the rearward portion of the tapered groove 140 in stem 136 communicating with the annular slot 148 of insert 126. The volumetric flow of adhesive is progressively increased as the adjustment pin 132 is threaded outwardly from the insert 126, since the cross section of the tapered groove 140 communicating with annular slot 148 progressively increases as the forward end 142 of stem 136 moves rearwardly. In this manner, volumetric flow through the recirculation valve 80 can be controlled to duplicate that of the dispensing valve 78 to ensure constant volumetric flow of adhesive to the center dispensing valves 70, 72.

Figure 3:
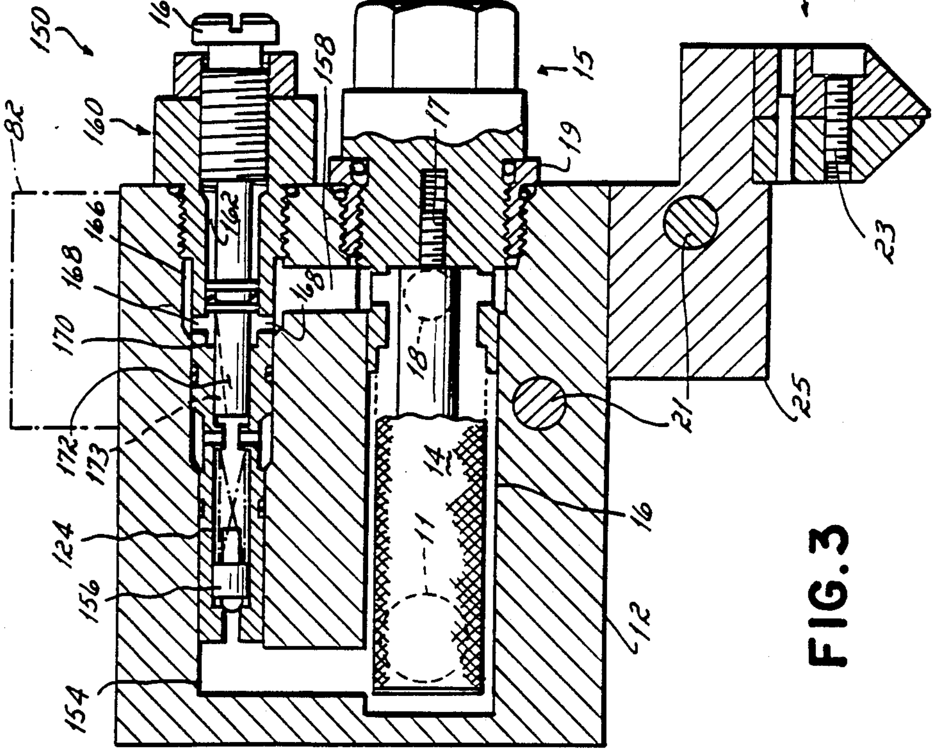
FIG. 3 is a partial cross sectional view of the adhesive supply pressure control of this invention herein taken generally along line 3—3 of FIG. 2.

As discussed above, adhesive is fed through a supply passageway 11 into a cartridge filter 14 mounted in a passageway 16 which connects the supply passageway 11 with adhesive manifold 18. As shown in FIG. 3, a relief line 154 is connected to the supply passageway 11 which leads to a spring-biased, one-way pressure relief valve 156 communicating with the adhesive recirculation passageway 124. In the event of a malfunction or shutdown of the system, the adhesive is diverted from the adhesive manifold 18 by the relief line 154 where it flows through the pressure relief valve 156 into the recirculation passageway 124 and back to the source through a line (not shown) connected by a fitting 125 to passageway 124.

During normal operation of the dispensing device 10, the adhesive flowing through cartridge filter 14 is directed into both the adhesive manifold 18 and a branch passageway 158 which leads to a flow rate control assembly 150 communicating with the adhesive recirculation passageway 124. The flow rate adjustment assembly 150 is essentially identical to the pressure adjustment assembly 114 described above.

Assembly 150 comprises an insert 160 mounted to the applicator head 12 formed with a throughbore 162 which receives an adjustment pin 164 axially movable within the insert 160. The branch passageway 158 communicates with an annular slot 166 formed in the applicator head 12, which, in turn, is connected through spaced bores 168 to an annular slot 170 formed in the insert 160. The stem 172 of the adjustment pin 164 is formed with a tapered groove 173 identical to that of adjustment pin 132. The axial movement of adjustment pin 164 within the insert 160 controls the volumetric flow of adhesive through the branch passageway 158 into the adhesive recirculation passageway 124 in the identical manner described above in connection with flow rate adjustment assembly 114. In this manner, the overall flow rate within the adhesive manifold 18 which feeds each of the dispensing valves 70, 72, 74, 78 can be controlled as desired.

As shown in FIGS. 1 and 2, the adhesive dispensing apparatus 10 is useful in the manufacture of disposable diapers. The applicator head 12 is mounted above the plastic backing sheet 64, preferably formed of polyurethane, polyethylene, polypropylene or a similar material, which is carried by rollers 170, 172. The center sections 26, 28 of the nozzle 20 apply continuous, parallel rows of adhesive beads 62 along the center portion of the backing sheet 64 which are controlled by a solenoid 100 connected by a control line 173 to a controller (not shown). The end sections 30, 32 of the nozzle 20 apply parallel rows of adhesive beads 63 of adhesive intermittently on each of the outer portions of the backing sheet 64. The solenoids 102, 104 which control the adhesive flow to end sections 30, 32 are connected by control lines 174, 176 to the controller which is programmed to cause the solenoids 102, 104 to open and close the outer dispensing valves 74, 78 at precise intervals so that gaps 65 with no adhesive are formed on the plastic backing sheet 64 where the leg holes of the diaper are to be cut.

The plastic backing sheet 64 is then fed between a pair of nip rollers 178, 180 for attachment to a non-woven layer 182 formed of cellulose fluff, wood pulp, textile fibers or similar material which is guided by rollers 184, 186 to the nip rollers 178, 180. The non-woven layer 182 is adhered to the backing sheet 64 by the pressure from roller 178, 180 producing an article 188 having continuous parallel rows of adhesive beads 62 in the center portion thereof, and intermittent, parallel rows of adhesive beads 63 at each outer portion on either side of the center portion. The gaps 65 without adhesive formed between adjacent rows of the intermittent beads 63 on each outer portion of backing sheet 64 produce areas in the article 188 with no adhesion between the non-woven layer 182 and backing sheet 64.

The article 188 is then conveyed beneath a reciprocating cutting mechanism 190, which is shown schematically on the righthand portion of FIG. 1. The cutting mechanism 190 is formed with opposed, semicircular cutting blades 192, 194 and an elongated straight-edge blade 196. The cutting mechanism 190 is movable into contact with the article 188 and against an anvil 191 so that the opposed cutting blades 192, 194 each cut a leg hole 198 on the outer portions of the article 188 where gaps 65 between adjacent, intermittent adhesive beads 63 were formed. At the same time, the straight-edge blade 196 makes a cut 197 transverse to the direction of travel of article 188 to form an individual disposable diaper 200.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, although the adhesive applied in parallel rows to the backing sheet 64 is shown in the Figs. as adhesive beads 62 and 63, it is contemplated that the adhesive could be applied in parallel rows of a spray pattern, e.g., a swirl spray pattern as disclosed in U.S. patent application Ser. No. 07/143,829, filed Jan. 14, 1988 and entitled "Spray Head Attachment For A Metering Gear Head" to Miller et al, which is incorporated by reference in its entirety herein.

Therefore, it is intended that the invention not be limited to the particular embodiment disclosed as the best mode contemplated for carrying out the invention, but that the invention will include all embodiments falling within the scope of the appended claims.

What is claimed is:

1. A method of manufacturing disposable diapers comprising:

passing a surface of a backing sheet portion of a disposable diaper beneath an adhesive dispenser connected to a source of molten thermoplastic material, said adhesive dispenser having first discharge orifices and second discharge orifices;

continuously dispensing multiple, parallel rows of molten thermoplastic adhesive from said first discharge orifices of said adhesive dispenser onto a center portion of the backing sheet;

intermittently dispensing multiple, parallel rows of molten thermoplastic adhesive from said second discharge orifices of said adhesive dispenser onto outer portions of the backing sheet on either side of the center portion to form spaced areas on the outer portions of the backing sheet with no adhesive;

adhering a non-woven layer portion of the disposable diaper to the backing sheet;

removing said spaced areas without adhesive from the outer portions of the backing sheet between said intermittent rows of adhesive to form the leg holes of the disposable diaper.

2. A method of manufacturing a disposable diaper, comprising:

continuously supplying adhesive to the first discharge orifices of an adhesive dispenser to dispense continuous, multiple parallel rows of adhesive upon the center portion of the backing sheet of a disposable diaper;

intermittently supplying adhesive to the second discharge orifices of said adhesive dispenser to form intermittent, multiple parallel rows of molten thermoplastic adhesive upon the outer portions of the backing sheet on either side of the center portion;

intermittently diverting adhesive from said second discharge orifices of said adhesive dispenser and recirculating the adhesive to a source of adhesive without creating a surge of adhesive to said first discharge orifices to form spaced areas with no adhesive on the outer portions of the backing sheet between the intermittent, multiple parallel rows of adhesive;

adhering a non-woven layer portion of the disposable diaper to the backing sheet;

removing said spaced areas without adhesive from the outer portions of the backing sheet between said intermittent rows of adhesive to form the leg holes of the disposable diaper.

3. A method of manufacturing a disposable diaper, comprising:

continuously supplying adhesive from a source to the first discharge orifices of an adhesive dispenser to form continuous, multiple parallel rows of adhesive upon the center portion of the backing sheet of a disposable diaper;

supplying adhesive to the second discharge orifices of said adhesive dispenser;

regularly interrupting the supply of adhesive to said second discharge orifices of said adhesive dispenser by recirculating the adhesive from said second discharge orifices to a source of adhesive so as to prevent pressure surges in the supply of adhesive to said first discharge orifices, said second discharge orifices forming interrupted rows of adhesive on the outer portions of the backing sheet on either side of the center portion with spaced areas having no adhesive between the interrupted rows of adhesive;

adhering a non-woven layer portion of the disposable diaper to the backing sheet;

removing said spaced areas without adhesive from the outer portions of the backing sheet between said interrupted rows of adhesive to form the leg holes of the disposable diaper.

4. The method of claim 3 in which said step of continuously supplying adhesive to said first discharge orifices of said adhesive dispenser further comprises:

directing adhesive from an adhesive inlet into a pair of runners formed in a nozzle of said adhesive dispenser, said runners extending outwardly from said adhesive inlet at an angle relative to one another;

directing adhesive from said runners into a triangular-shaped slot formed in said nozzle, said triangular-shaped slot having a small depth compared to the depth of said runners;

directing adhesive from said triangular-shaped slot at the same pressure into each of said first discharge orifices.

5. The method of claim 3 in which said step of supplying adhesive to said second discharge orifices of said adhesive dispenser further comprises:

directing adhesive from an adhesive inlet into a pair of runners formed in a nozzle of said adhesive dispenser, said runners extending outwardly from said adhesive inlet at an angle relative to one another;

directing adhesive from said runners into a triangular-shaped slot formed in said nozzle, said triangular-shaped slot having a small depth compared to the depth of said runners;

directing adhesive from said triangular-shaped slot at the same pressure into each of said second discharge orifices.

6. A method of manufacturing a multi-ply product comprising:

passing a first ply of a multi-ply product beneath an adhesive dispenser connected to a source of molten thermoplastic material; said adhesive dispenser having first discharge orifices and second discharge orifices;

continuously dispensing multiple, parallel rows of molten thermoplastic adhesive from said first discharge orifices of said adhesive dispenser onto a center portion of the first ply;

intermittently dispensing multiple, parallel rows of molten thermoplastic adhesive from said second discharge orifices of said adhesive dispenser onto the outer portions of the first ply on either side of the center portion to form spaced areas on the end portions of the first ply with no molten thermoplastic adhesive;

adhering a second ply of the multi-ply product to the first ply;

removing said spaced areas without adhesive from the outer portions of the first ply between said intermittent rows of adhesive.

* * * * *